(12) United States Patent
Tuerk et al.

(10) Patent No.: US 11,320,035 B2
(45) Date of Patent: May 3, 2022

(54) GEAR WHEEL, IN PARTICULAR IDLER GEAR, FOR A GEAR TRAIN

(71) Applicant: MAN Truck & Bus AG, Munich (DE)

(72) Inventors: Jens Tuerk, Postbauer-Heng (DE); Marcus Viet, Hünfeld-Sargenzell (DE)

(73) Assignee: MAN Truck & Bus AG, Munich (DE)

( * ) Notice: Subject to any disclaimer, the term of this patent is extended or adjusted under 35 U.S.C. 154(b) by 548 days.

(21) Appl. No.: 16/186,086

(22) Filed: Nov. 9, 2018

(65) Prior Publication Data

US 2019/0136955 A1 May 9, 2019

(30) Foreign Application Priority Data

Nov. 9, 2017 (DE) .......................... 102017126205.9

(51) Int. Cl.
| | | |
|---|---|---|
| *F16H 55/18* | (2006.01) | |
| *F16H 1/20* | (2006.01) | |
| *F16H 57/12* | (2006.01) | |

(52) U.S. Cl.
CPC .............. *F16H 55/18* (2013.01); *F16H 1/20* (2013.01); *F16H 57/12* (2013.01); *F16H 2055/185* (2013.01); *F16H 2057/127* (2013.01)

(58) Field of Classification Search
CPC ...... F16H 55/18; F16H 2055/185; F16H 1/20; F16H 57/12; F16H 2057/127
See application file for complete search history.

(56) References Cited

U.S. PATENT DOCUMENTS

| | | | | |
|---|---|---|---|---|
| 1,386,089 A | * | 8/1921 | Butzen ..................... | F16H 55/18 74/440 |
| 1,418,461 A | * | 6/1922 | Pierce, Jr. ............... | F16H 55/18 74/440 |
| 1,539,149 A | * | 5/1925 | Thornburg .............. | F16H 55/18 74/440 |
| 1,558,222 A | * | 10/1925 | Beetow ................... | F16H 55/18 74/440 |

(Continued)

FOREIGN PATENT DOCUMENTS

| | | |
|---|---|---|
| DE | 10058482 A1 | 6/2002 |
| DE | 20102749 U1 | 6/2002 |

(Continued)

OTHER PUBLICATIONS

German Search report for related application No. DE 102017126205.9, dated Jul. 26, 2018.

(Continued)

*Primary Examiner* — William Kelleher
*Assistant Examiner* — Gregory T Prather
(74) *Attorney, Agent, or Firm* — Maginot, Moore & Beck LLP

(57) ABSTRACT

A gear wheel, in particular an idler gear, for reducing backlash in a gear train, includes a first wheel part and a second wheel part. The first wheel part has multiple teeth that are distributed over a periphery of the first wheel part. The first wheel part may rotate about a first axis (A). The second wheel part has multiple teeth that are distributed over a periphery of the second wheel part. The second wheel part may rotate about a second axis (B) that is arranged parallel to and offset with respect to the first axis.

18 Claims, 3 Drawing Sheets

(56) References Cited

U.S. PATENT DOCUMENTS

| | | | | |
|---|---|---|---|---|
| 2,845,809 A * | 8/1958 | Hetzel | F16H 55/18 | 74/440 |
| 2,902,879 A * | 9/1959 | Andersen | F16H 55/18 | 74/440 |
| 3,037,396 A * | 6/1962 | Martin | F16H 55/18 | 74/409 |
| 3,127,784 A * | 4/1964 | O'Neill | F16H 55/18 | 74/440 |
| 3,138,035 A * | 6/1964 | Sivaslian | F16H 55/18 | 74/440 |
| 3,174,356 A * | 3/1965 | Michalec | F16H 55/18 | 74/440 |
| 3,359,819 A * | 12/1967 | Veillette | F16H 55/18 | 74/409 |
| 3,365,973 A * | 1/1968 | Henden | F16H 55/18 | 74/409 |
| 3,602,058 A * | 8/1971 | Beddoe | D01H 1/20 | 74/434 |
| 3,648,534 A * | 3/1972 | Fagarazzi | F16H 55/18 | 74/440 |
| 3,719,103 A * | 3/1973 | Streander | F16H 55/18 | 74/445 |
| 3,803,936 A * | 4/1974 | Kroeper | F16H 55/18 | 74/409 |
| 4,408,526 A * | 10/1983 | Mathes | B41F 13/012 | 101/216 |
| 4,617,882 A * | 10/1986 | Matsumoto | F01L 1/02 | 123/195 A |
| 4,640,147 A * | 2/1987 | Yasukawa | F16H 55/18 | 74/409 |
| 4,688,441 A * | 8/1987 | Yasukawa | F16H 55/18 | 74/409 |
| 4,739,670 A * | 4/1988 | Tomita | F16H 55/18 | 74/409 |
| 4,745,823 A * | 5/1988 | Morita | F16H 55/18 | 74/409 |
| 4,747,321 A * | 5/1988 | Hannel | F16H 55/18 | 74/409 |
| 5,181,433 A * | 1/1993 | Ueno | F16H 55/08 | 74/409 |
| 5,240,462 A * | 8/1993 | Mochizuki | F16H 1/2863 | 475/341 |
| 5,813,335 A * | 9/1998 | Burke | B41F 13/012 | 101/177 |
| 5,870,928 A * | 2/1999 | Genter | F16H 55/18 | 74/409 |
| 5,964,150 A * | 10/1999 | Kato | B41F 13/012 | 101/216 |
| 5,979,259 A * | 11/1999 | Shook | F16H 55/18 | 123/90.31 |
| 5,979,260 A * | 11/1999 | Long | F16H 55/18 | 464/62.1 |
| 6,109,129 A * | 8/2000 | Genter | F16H 55/18 | 74/397 |
| 6,148,684 A * | 11/2000 | Gardiner | B41F 13/012 | 101/216 |
| 6,419,061 B1 * | 7/2002 | Ring | B61H 13/04 | 188/82.84 |
| 7,752,937 B1 * | 7/2010 | Dornan | F16H 55/18 | 74/409 |
| 10,746,061 B1 * | 8/2020 | Jeon | F01L 1/053 | |
| 2002/0121152 A1 * | 9/2002 | White | F16H 55/18 | 74/445 |
| 2002/0128098 A1 * | 9/2002 | Mott | F16H 57/12 | 474/94 |
| 2002/0148672 A1 * | 10/2002 | Tatewaki | B62D 5/0424 | 180/443 |
| 2003/0015051 A1 * | 1/2003 | Nomura | F16H 55/18 | 74/409 |
| 2003/0068177 A1 * | 4/2003 | Kitayama | F16H 55/18 | 399/167 |
| 2003/0136212 A1 * | 7/2003 | Allen | F16H 57/0006 | 74/460 |
| 2004/0069086 A1 * | 4/2004 | Thoma | F16H 55/18 | 74/443 |
| 2004/0089089 A1 * | 5/2004 | Stevens | F16H 55/18 | 74/440 |
| 2004/0103737 A1 * | 6/2004 | Ask | F16H 55/18 | 74/445 |
| 2004/0253912 A1 * | 12/2004 | Menjak | F16H 55/06 | 451/47 |
| 2005/0139029 A1 * | 6/2005 | Fukizawa | F16H 55/28 | 74/445 |
| 2007/0186717 A1 * | 8/2007 | Chapelain | F16H 55/18 | 74/552 |
| 2007/0215091 A1 * | 9/2007 | Ho | F01L 1/024 | 123/192.2 |
| 2008/0141811 A1 * | 6/2008 | Sandner | F16H 55/18 | 74/434 |
| 2008/0156574 A1 * | 7/2008 | Otsuki | B62D 5/0409 | 180/444 |
| 2009/0095103 A1 * | 4/2009 | Duzzie | F16H 55/18 | 74/409 |
| 2010/0050799 A1 * | 3/2010 | Brackney | F16H 55/18 | 74/409 |
| 2010/0139431 A1 * | 6/2010 | Park | F16H 55/18 | 74/409 |
| 2010/0232035 A1 * | 9/2010 | Takamatsu | F16H 55/18 | 359/696 |
| 2010/0240490 A1 * | 9/2010 | Schafer | F16H 1/2863 | 475/347 |
| 2010/0242649 A1 * | 9/2010 | Vandewal | F16H 55/18 | 74/409 |
| 2010/0326223 A1 * | 12/2010 | Lang | F16H 55/18 | 74/409 |
| 2011/0174105 A1 * | 7/2011 | Meier | F16D 1/116 | 74/448 |
| 2011/0203398 A1 * | 8/2011 | Meier | F16H 55/18 | 74/448 |
| 2013/0112027 A1 * | 5/2013 | Buchleitner | F16H 55/18 | 74/440 |
| 2013/0150205 A1 * | 6/2013 | Wu | F16H 55/18 | 475/347 |
| 2013/0199323 A1 * | 8/2013 | Fong | F16H 55/18 | 74/409 |
| 2013/0213168 A1 * | 8/2013 | Buchleitner | B22F 5/08 | 74/445 |
| 2013/0228029 A1 * | 9/2013 | Murphy | F16H 55/18 | 74/443 |
| 2014/0116174 A1 * | 5/2014 | Sandner | F16H 57/12 | 74/440 |
| 2014/0123795 A1 * | 5/2014 | Izume | B41F 13/12 | 74/409 |
| 2014/0130629 A1 * | 5/2014 | Bertram | F16H 55/18 | 74/440 |
| 2014/0216190 A1 * | 8/2014 | Dickinger | F16H 55/18 | 74/409 |
| 2014/0224053 A1 * | 8/2014 | Buchleitner | F16H 55/17 | 74/445 |
| 2014/0360300 A1 * | 12/2014 | Viechtbauer | F16H 55/18 | 74/445 |
| 2015/0020627 A1 * | 1/2015 | Palfai | F02B 75/28 | 74/421 R |
| 2015/0020629 A1 * | 1/2015 | Koszewnik | F16H 55/08 | 74/445 |
| 2015/0047450 A1 * | 2/2015 | Mitchum | F16H 57/12 | 74/445 |
| 2015/0198205 A1 * | 7/2015 | Van Lieshout | F16D 3/10 | 74/445 |
| 2015/0316135 A1 * | 11/2015 | Schnolzer | F16H 55/18 | 74/440 |
| 2015/0316136 A1 * | 11/2015 | Schnolzer | F16H 55/18 | 74/409 |
| 2016/0009315 A1 * | 1/2016 | Reep | B62D 3/02 | 74/409 |
| 2016/0033030 A1 * | 2/2016 | Palfai | F16H 57/12 | 74/409 |

(56) References Cited

U.S. PATENT DOCUMENTS

| | | | | |
|---|---|---|---|---|
| 2016/0053881 A1* | 2/2016 | Zeller | .................... | F16H 55/18 |
| | | | | 74/440 |
| 2016/0305529 A1* | 10/2016 | Tronnberg | .............. | F16H 55/18 |
| 2016/0377172 A1* | 12/2016 | Dumanski | ............... | F16H 55/18 |
| | | | | 74/409 |
| 2017/0002915 A1* | 1/2017 | Giberman | ............... | F16H 57/12 |
| 2017/0356542 A1* | 12/2017 | Sahasrabudhe | ....... | F02B 75/065 |
| 2017/0363197 A1* | 12/2017 | Sefcik | .................... | F16H 55/14 |
| 2018/0017151 A1* | 1/2018 | Steinmaurer | ........... | F16H 55/17 |
| 2018/0073619 A1* | 3/2018 | Le Roy | .................. | F16H 55/14 |
| 2018/0216716 A1* | 8/2018 | Vann Lieshout | ....... | F16H 57/12 |
| 2018/0363751 A1* | 12/2018 | Demots | .................. | F02B 67/04 |
| 2019/0101181 A1* | 4/2019 | Tronquoy | .............. | F16H 55/18 |
| 2019/0101182 A1* | 4/2019 | Tronquoy | ............. | F16F 15/267 |
| 2019/0195337 A1* | 6/2019 | Jeon | ........................ | F01L 1/026 |
| 2020/0200252 A1* | 6/2020 | Jeon | .................... | F16H 57/0025 |

FOREIGN PATENT DOCUMENTS

| | | |
|---|---|---|
| DE | 102009015947 A1 | 10/2010 |
| DE | 102009055214 A1 | 6/2011 |
| DE | 102017113900 A1 | 1/2018 |
| FR | 1559798 A | 3/1969 |

OTHER PUBLICATIONS

European Search Report in related case No. EP 18203450.4, dated Mar. 15, 2019.

* cited by examiner

GEAR WHEEL, IN PARTICULAR IDLER GEAR, FOR A GEAR TRAIN

The invention relates to a gear wheel, in particular an idler gear, for reducing backlash in a gear train.

Gear drives that are exposed to greatly varying torques tend to develop transmission rattle at low engine rotational speeds and transmission whistle at high engine rotational speeds. This is particularly pronounced when driving air compressors on engines of commercial vehicles. Piston air compressors have the characteristic that the sign of the torque reverses for a short time after exceeding the upper dead centre by means of re-expansion. The result is the tooth flanks hitting against one another and the acoustic rattle that results therefrom.

DE 100 58 482 A1 proposes for this purpose a gear wheel for absorbing angular momentum. Undesirable noises are avoided by virtue of the fact that a gear wheel is formed from two wheel parts that are connected via an elastomer in a torque-conducting manner. In the disassembled state, the teeth of the wheel parts are rotated against one another. After installing the gear wheel, the wheel parts are rotated with respect to one another in such a manner that the teeth almost align. This is achieved by virtue of the fact that the teeth of a further gear wheel that meshes with the gear wheel hold the teeth of the wheel parts in this position. By virtue of the elastomer, the rotation and the self-aligning torque that results therefrom produces a permanent prestressing arrangement with the result that the tooth flanks of the wheel parts and the gear wheel that meshes with said tooth flanks are always in positive-locking contact. In the case of gear trains in which two gear wheels are in engagement, the function is fully provided when used at the drive wheel or the output wheel. In the case of gear trains in which three gear wheels are in engagement and in which the multi-part gear wheel is used as an idler gear, the function is no longer entirely provided. It may be conceptionally disadvantageous at the divided gear wheel that said gear wheel only absorbs the effects.

The object of the invention is to provide an alternative or improved gear wheel for a gear train, said gear wheel rendering it possible when being used in particular as an idler gear to effectively reduce or compensate for backlash. In particular, as an idler gear it is therefore to provide the possibility of reducing or compensating the backlash at a driving wheel and a driven wheel via the idler gear.

The object is achieved by virtue of a gear wheel and a gear train in accordance with the independent claims. Advantageous further developments are disclosed in the dependent claims and the description.

The gear wheel may be in particular an idler gear. The gear wheel is suitable for reducing backlash and/or for compensating for backlash in a gear train. The gear wheel comprises a first wheel part having multiple teeth that are distributed over a periphery of the first wheel part. The first wheel part may rotate about a first axis. The gear wheel comprises a second wheel part having multiple teeth that are distributed over a periphery of the second wheel part. The second wheel part may rotate about a second axis that is arranged parallel to and offset with respect to the first axis.

The parallel arrangement of the first axis and the second axis causes the second wheel part to be mounted in an eccentric manner with respect to the first wheel part. The centre of rotation of the first wheel part and the centre of rotation of the second wheel part are offset in the installed state in a radial direction by the distance of the first axis with respect to the second axis. As a consequence, an offset arrangement may be produced in the peripheral direction between the multiple teeth of the first wheel part and the multiple teeth of the second wheel part (the teeth do not align with one another). The gear wheel may therefore be used as an idler gear in a gear train so as to reduce backlash or to compensate for backlash, wherein the tooth load flank change from the drive wheel to the idler gear and from the idler gear to the output wheel is taken into account. The tooth flanks of the teeth of the first wheel part are brought into position with respect to the load flanks of a drive wheel and an output wheel of the drive gear so as to transmit a torque from the drive wheel via the idler gear to the output wheel. The eccentric bearing of the second wheel part renders it possible for the teeth of the second wheel part and the first wheel part to be offset with respect to one another in such a manner that the tooth flanks of the second wheel part come into engagement with the trailing edges of the drive wheel and the output wheel.

In particular, the teeth of the first wheel part may be distributed uniformly over an outer periphery of the first wheel part. Alternatively or in addition thereto, the teeth of the second wheel part may be distributed uniformly over an outer periphery of the second wheel part.

It is preferred that a number of the multiple teeth of the first wheel part corresponds to a number of the multiple teeth of the second wheel part.

It is preferred that the multiple teeth of the first wheel part and the multiple teeth of the second wheel part are constructed in an identical manner.

In a particularly preferred exemplary embodiment, the second wheel part may deform in regions in an elastic manner in a radial direction in relation to the second axis. By way of example, the second wheel part may be produced in regions from an elastic material, and may comprise an elastic element and/or an elastic structure. The elasticity of the second wheel part renders it possible in combination with the eccentric position of the centre of rotation of the second wheel part to brace said second wheel part between the trailing edges of the drive wheel, the trailing edges of the output wheel and the bearing of the second wheel part. In addition, the second wheel part may deform in an elastic manner in order to adjust the positions of the trailing edges of the drive wheel and output wheel, said positions resulting from the production tolerances. In particular, the second wheel part is to not deform in an elastic manner if the sign of the drive torque or the output torque changes. The goal is to prevent the load flanks from lifting. This is achieved in that the pre-stressing force from the eccentric seat of the centre of rotation of the second wheel part and also the elasticity of said second wheel part compensates for the negative portion of the torque and therefore at this moment in time does not lead to an elastic deformation of the second wheel part or to the load flanks lifting. However, the elasticity of the second wheel part has a positive effect on the adjustment to the production tolerances and the backlash that occurs in practice. Alternatively, this could also be ensured via the screwing arrangement of the first and the second bearing bolt.

In one exemplary embodiment, the second wheel part may rotate relative to the first wheel part. In particular, the first wheel part may be embodied from a solid material.

In one preferred exemplary embodiment, the second wheel part comprises at least one gear wheel sheet. The at least one gear wheel sheet may deform in an elastic manner in a radial direction in relation to the second axis. The use of gear wheel sheets that comprise by way of example a material thickness of approximately 1 mm renders it possible to integrate the elasticity into the structure of the gear wheel sheets, for example by means of providing elongated holes in the gear wheel sheets.

In a further development, multiple gear wheel sheets are provided that are arranged adjacent to one another and/or form a gear wheel sheet stack.

It is preferred that the gear wheel sheets may be oriented in such a manner that they align with one another in an axial direction.

In a further exemplary embodiment, the second wheel part and/or the at least one gear wheel sheet are/is produced from a spring steel. An elasticity may consequently be ensured in regions by means of providing corresponding structures.

In one embodiment, the at least one gear wheel sheet comprises at least one elongated hole, preferably multiple elongated holes so as to provide an elasticity of the second wheel part. The at least one elongated hole extends in a peripheral direction about the second axis, in particular in a circular and/or helical manner.

In a further embodiment, the gear wheel comprises a first wheel stud about which the first wheel part is mounted in a rotatable manner. Alternatively or in addition thereto, the gear wheel comprises a second wheel stud about which the second wheel part is mounted in a rotatable manner. It is preferred that the first wheel stud and the second wheel stud may be fastened to one another in an eccentric manner with respect to one another, in particular via a press fit arrangement.

In a further development the gear wheel comprises a first plain bearing bush that is arranged between the first wheel stud and the first wheel part. Alternatively or in addition thereto, the gear wheel comprises a second plain bearing bush that is arranged between the second wheel stud and the second wheel part.

In order to lubricate the plain bearing bush, an in particular central lubrication duct may be provided in the first wheel stud and/or the second wheel stud. It is preferred that a first radial duct may extend from the lubrication duct to the first plain bearing bush and/or a second radial duct may extend to the second plain bearing bush so as to supply a lubricating fluid. By way of example, a lubricating fluid may be supplied to the lubrication duct via ducts in a crankcase of the internal combustion engine. By way of example, the first radial duct and/or the second radial duct may be provided in the first wheel stud, between the first wheel stud and the second wheel stud or in the second wheel stud.

It is also possible that the gear wheel comprises at least one further wheel part that may be embodied respectively according to the second wheel part of the idler gear. By way of example, in the case of multiple output wheels for each output wheel a dedicated "second" wheel part may therefore be provided.

The invention also relates to a gear train for a motor vehicle. The gear train comprises an idler gear that is disclosed as a gear wheel as herein. The gear train comprises a drive wheel that meshes with the first wheel part of the idler gear and the second wheel part of the idler gear. The gear train comprises an output wheel that meshes with the first wheel part of the idler gear and the second wheel part of the idler gear. The gear train may achieve the advantages described herein for the gear wheel.

In a preferred embodiment variant, the second wheel part of the idler gear is braced by the drive wheel, in particular by trailing edges of the drive wheel, and the output wheel, in particular by trailing edges of the output wheel, in a direction with respect to the second axis in particular in an elastic manner.

In a further preferred embodiment variant, load flanks of the drive wheel and load flanks of the output wheel are in engagement with the first wheel part. Alternatively or in addition thereto, trailing edges of the drive wheel and trailing edges of the output wheel are in engagement with the second wheel part.

In a further embodiment variant, the second axis is arranged offset in relation to the first axis in a direction of an angle bisector in relation to an angle that is defined between an axis of rotation of the drive wheel, of the first axis and an axis of rotation of the output wheel. This offset arrangement renders it possible that the tooth flanks of the second wheel part may be brought into position with respect to the trailing edges both of the drive wheel as well as the output wheel.

In one embodiment, the multiple teeth of the first wheel part contact load flanks of the drive gear wheel and load flanks of the output gear wheel. Alternatively or in addition thereto, the multiple teeth of the second wheel part contact trailing edges of the drive gear wheel and trailing edges of the output gear wheel.

In particular, the load flanks and the trailing edges of the drive gear wheel may lie opposite one another. The load flanks and the trailing edges of the output gear wheel may likewise lie opposite one another.

In a further embodiment, a lifting of the multiple teeth of the first wheel part from load flanks of the drive wheel and from load flanks of the output wheel in the case of a change of sign of the drive torque and/or the output torque and/or in the case of torsional oscillations is counteracted by means of bracing the second wheel part, said bracing resulting in particular from the offset arrangement between the first wheel part and the second wheel part and an elasticity of the second wheel part.

In one exemplary embodiment, multiple output wheels are provided that mesh with the idler gear. A further wheel part of the idler gear is provided for each output wheel, said further wheel part being embodied in each case corresponding to the second wheel part of the idler gear.

The invention also relates to a motor vehicle, in particular a commercial vehicle (for example a truck or an omnibus). The motor vehicle comprises a gear train as disclosed herein. The motor vehicle optionally comprises a compressor for compressing air that is driven via the gear train.

It is also possible to use the gear wheel as disclosed herein and/or the gear train as disclosed herein in any other machine.

In particular, it is also possible to use the gear wheel as disclosed herein and/or the gear train as disclosed herein in other driven units that comprise a torque curve having a change of sign.

Moreover, the gear wheel as disclosed herein and/or the gear train as disclosed herein may also be used so as to reduce and/or prevent a transmission of torsional oscillations of a crank shaft of an internal combustion engine.

The above-described preferred embodiments and features of the invention may be combined with one another in an arbitrary manner. Further details and advantages of the invention are described below with reference to the attached drawings. In the drawings.

Figure 1:
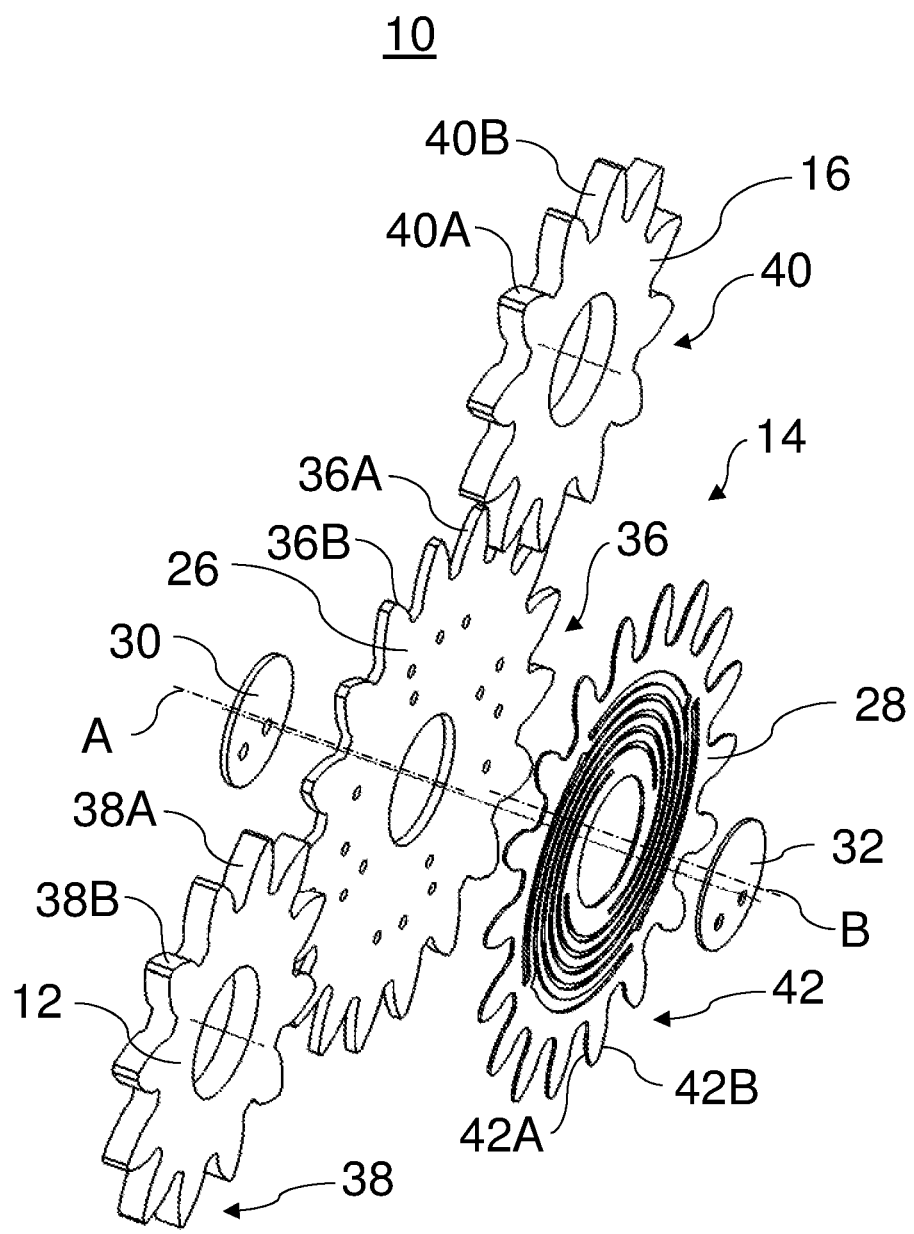
FIG. 1 illustrates a schematic model of a gear train in an exploded view.

The embodiments that are illustrated in the figures correspond at least in part with the result that similar or identical parts are provided with the same reference numeral and with regard to their explanation reference is also made to the description of the other embodiments or figures in order to avoid repetitions.

Figure 2:
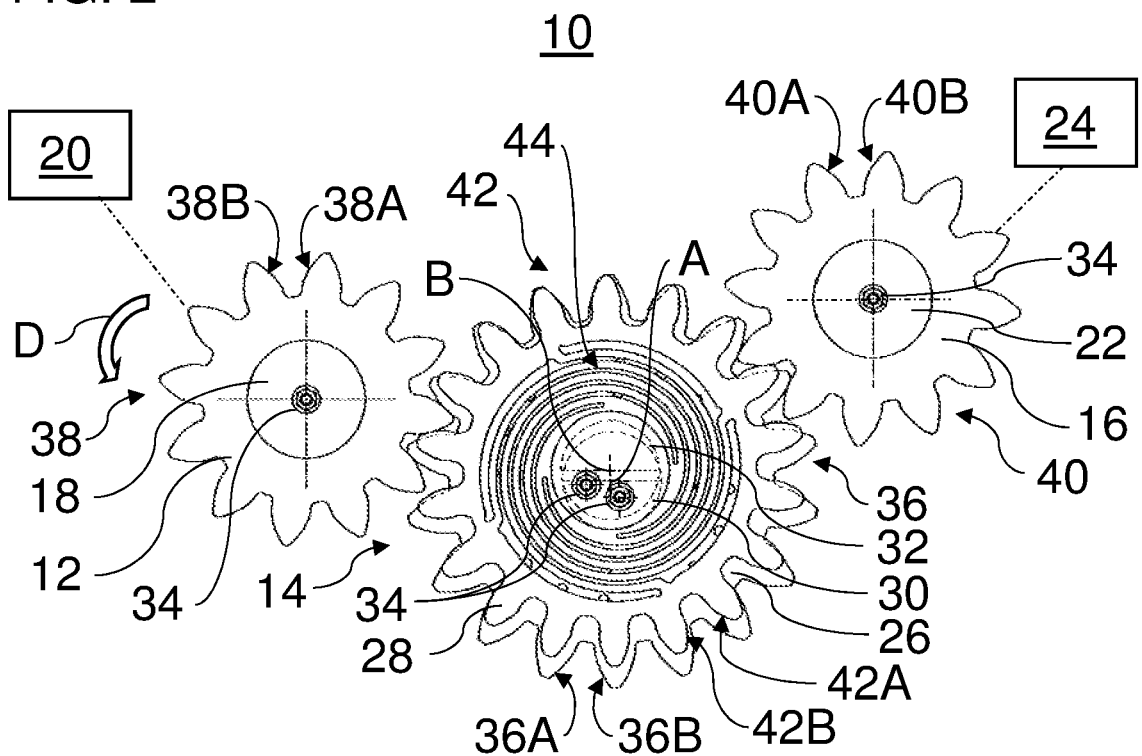
FIG. 2 illustrates a front view of the schematic model of a gear train.
Figure 3:
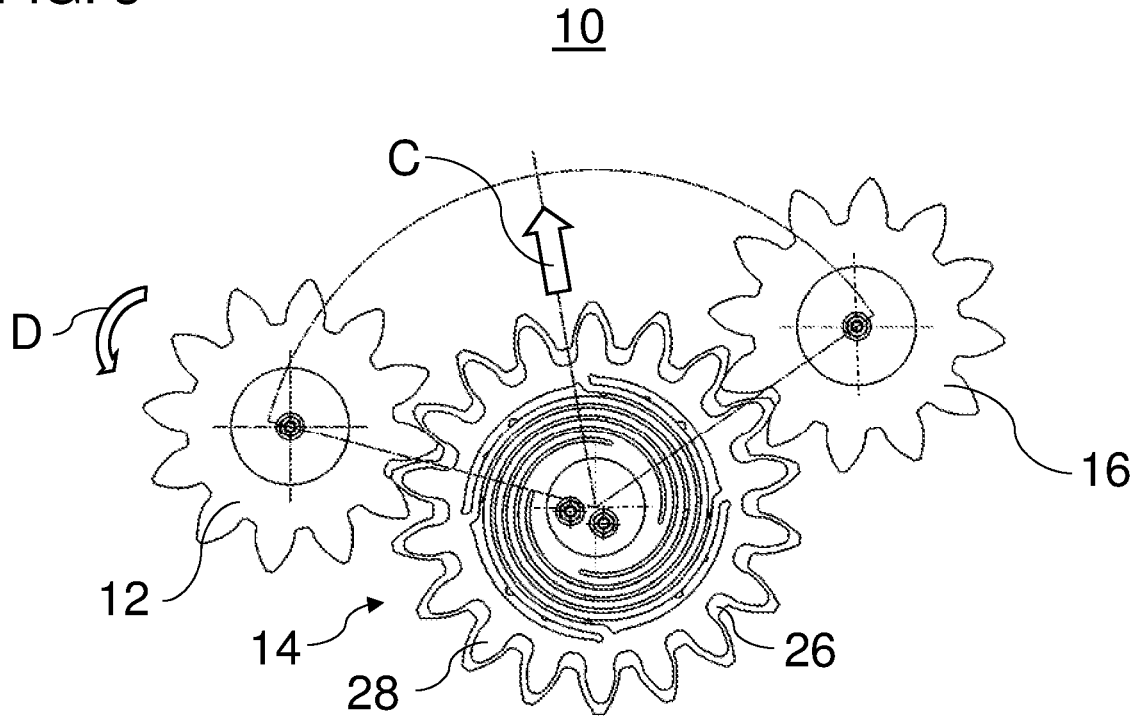
FIG. 3 illustrates a further front view of the schematic model of a gear train in the non-mounted state.

In the FIGS. 1 to 3 a schematic model of a gear train 10 in accordance with the current disclosure is illustrated in various views so as to explain the functioning of the gear train 10.

An exemplary construction of the gear train 10 is described below with reference to FIGS. 1 and 2.

The gear train 10 comprises a drive wheel 12, an idler gear 14 and output wheel 16. The drive wheel 12 meshes with the idler gear 14 that in turn meshes with the output wheel 16. It is also possible that multiple output wheels 16 mesh with the idler gear 14.

The drive wheel 12, the idler gear 14 and the output wheel 16 are mounted respectively on corresponding wheel studs in a rotatable manner. The wheel studs of the gear wheels 12, 14 and 16 are fastened by way of example via screws 34 (cf. FIG. 2) on the crankcase of the internal combustion engine.

The drive wheel 12 is mounted in a rotatable manner on a wheel stud 18 (cf. FIG. 2). The drive wheel 12 may be driven by way of example by a crankshaft 20 (illustrated schematically in FIG. 2) of an internal combustion engine of a motor vehicle. The motor vehicle may be by way of example a commercial vehicle, in particular an omnibus or a truck. It is also possible that the drive wheel 12 is driven in another manner.

The output wheel 16 is mounted in a rotatable manner on a wheel stud 22 (cf. FIG. 2). The output wheel 16 may be used by way of example so as to drive an auxiliary consumer 24 (illustrated schematically in FIG. 2) of the motor vehicle. In particular, the auxiliary consumer 24 may tend towards rotational irregularity and torsional oscillations in the form of a torque curve having a change in sign on account of the manner in which said auxiliary consumer functions and/or on account of the configuration of said auxiliary consumer.

The auxiliary consumer 24 may be by way of example an oil pump, a hydraulic pump or an air compressor. The air compressor of a commercial vehicle conventionally comprises by way of example a non-uniform output torque having a change of sign that results from its design. The air compressor may function by way of example according to the principle of a plunger compressor. Air is drawn in through an inlet valve of the air compressor, is compressed in a cylinder of the air compressor by means of a piston of the air compressor and is pushed out via an outlet valve of the air compressor. Depending upon the design, residual compressed air remains in the cylinder after the procedure of pushing air out. This residual air expands after exceeding the upper dead centre of a piston movement of the piston and returns energy via drive kinematics of the air compressor.

Further rotational irregularities and torsional oscillations in the gear train 10 result by way of example from a non-uniform torque curve of the crankshaft 20 of the internal combustion engine. Expressed in simple terms, the cooperation of the gas force in a cylinder and the mass force of the kinematics results in an alternating torque curve over the crank angular range 720°. These individual curves are superimposed in the case of multi-cylinder engines on a total curve that comprises minima and maxima. The characteristics of this torque curve are by way of example dependent upon a cylinder number, an ignition pressure and the combustion.

If countermeasures for reducing or compensating for the backlash are not undertaken, it is possible on account of the change of sign of the drive torques and output torques for the load flanks of the gear wheels of the gear train to lift within the backlash. The subsequent contact that the tooth flanks make with one another results in disturbing noises and an increased wear.

The present disclosure compensates for or reduces at least the backlash between the drive wheel 12 and the idler gear 14 and between the idler gear 14 and the output wheel 16 with the result that an increased wear and disturbing noises are prevented or at least reduced.

For this purpose, the idler gear 14 comprises a first wheel part 26 and a second wheel part 28.

The first wheel part 26 is mounted so that it may rotate about a first axis A (cf. FIG. 2). The second wheel part 28 is mounted so that it may rotate about a second axis B (cf. FIG. 2), said axis being arranged offset and parallel with respect to the first axis A.

With reference to FIG. 2, it is illustrated that the second axis B of the second wheel part 28 is arranged in a radial direction of the first axis A of the first wheel part 26 offset with respect to the first axis A. Specifically, the second wheel part 28 is offset along an arrow C. The arrow C extends along an angle bisector. The angle bisector halves an angle that is defined between an axis of rotation of the drive wheel 12, the first axis A and an axis of rotation of the output wheel 16. The angle bisector extends through the first axis A. As is described in detail below, the second wheel part 28 is arranged offset with respect to the first wheel part 26 in such a manner that tooth flanks of the second wheel part 28 make contact with trailing edges of the drive wheel 12 and of the output wheel 16. The centre of rotation of the first wheel part 26 (axis A) and the centre of rotation of the second wheel part 28 (axis B) are offset in the installed state in a radial direction by the distance of the first axis A with respect to the second axis B. As a consequence, an offset arrangement is produced in the peripheral direction between the multiple teeth 36 of the first wheel part 26 and the multiple teeth 42 of the second wheel part 28.

With further reference to FIG. 2, it is illustrated that the first wheel part 26 in particular is mounted so that it may rotate about a first wheel stud 30 of the idler gear 14. The first wheel stud 30 comprises the first axis A as a centre axis. The position of the first axis A and therefore of the first wheel part 26 is oriented in this case towards the operating pitch circles of the classic toothing design between the drive wheel 12, the idler gear 14 and the output wheel 16. The second wheel part 28 is mounted in particular so that it may rotate about a second wheel stud 32. The second wheel stud 32 comprises the second axis B as a centre axis. The first wheel part 26 may rotate relative to the second wheel part 28.

The first wheel stud 30 and the second wheel stud 32 may be fastened to one another by means of screws 34. However, by way of example a press fit arrangement between the wheel studs 30, 32 is also possible. The screws 34 may fasten the wheel studs 18, 22, 30 and 32 by way of example on a crankcase of the internal combustion engine.

The first wheel part 26 comprises on an outer periphery of said wheel part multiple teeth 36 that are distributed uniformly over the outer periphery. The teeth 36 mesh with teeth 38 of the drive wheel 12 and with teeth 40 of the output wheel 16. During the normal operation the drive wheel 12 rotates by way of example anticlockwise in a direction of rotation D (cf. FIGS. 2 and 3). The drive wheel 12 drives the idler gear 14. The idler gear 14 rotates in the clockwise direction. In this case, load flanks 38A of the teeth 38 of the drive wheel 12 mesh with first load flanks 36A of the teeth 36 of the first wheel part 26 of the idler gear 14. The idler gear 14 in turn drives the output wheel 16. The output wheel 16 rotates anticlockwise. In this case, second load flanks 36B, which lie opposite the first load flanks 36A, of the first wheel part 26 of the idler gear 14 mesh with load flanks 40A of the output wheel 16. A backlash occurs between trailing edges 38B of the drive wheel 12, which lie opposite the load flanks 38A, and the second load flanks 36B of the first wheel part 26 of the idler gear 14 depending upon the assembly and so that the gear wheels 12, 14 may turn freely. A backlash likewise occurs between trailing edges 40B of the output wheel 16, which lie opposite the load flanks 40A, and the first load flanks 36A of the first wheel part 26 of the idler gear 14 depending upon the assembly and so that the gear wheels 14, 16 may turn freely. This backlash may be compensated for or at least clearly reduced by means of the second wheel part 28 of the idler gear 14.

The second wheel part 28 comprises on an outer periphery of said wheel part multiple teeth 42 that are distributed uniformly over the outer periphery. The second wheel part 28 is braced between the drive wheel 12, the output wheel 16 and the second wheel stud 32 in such a manner that first tooth flanks 42A of the teeth 42 of the second wheel part 28 of the idler gear 14 mesh with the trailing edges 38B of the teeth 38 of the drive wheel 12. Moreover, second tooth flanks 42B of the teeth 42 of the second wheel part 28 of the idler gear 14 mesh with the trailing edges 40B of the teeth 40 of the output wheel 16.

The second wheel part 28 comprises an elastic region 44. The elastic region 44 may be embodied by way of example by means of elongated holes that extend by way of example in a helical manner about the second axis B. The second wheel part 28 may be produced by way of example from spring steel. The second wheel part 28 may deform in regions in an elastic manner in a radial direction towards the second axis B on account of the elastic region 44.

As has been explained above in detail, the centre of rotation of the second wheel part 28 may be arranged in an eccentric manner with respect to the centre of rotation of the first wheel part 26. Moreover, the second wheel part 28 may deform in regions in an elastic manner. The pre-stressing force, which is generated by means of the eccentricity and the elasticity of the second wheel part 28, between the second wheel part 28 on one hand and the drive wheel 12 and output wheel 16 on the other hand prevents the load flanks of the gear wheels 12, 14 and 16 from lifting. As a consequence, undesired acoustic emissions and increased wear on the tooth flanks may be avoided. In other words, the idler gear 14 may compensate for the effects of the backlash on the drive wheel 12 and on the output wheel 16 in the case of a corresponding design by means of the second wheel part 28 being offset in an eccentric manner. The pre-stressing force is ensured by means of the elasticity at the second wheel part 28 and also the eccentric offset arrangement of the centre of rotation of the second wheel part 28 relative to the first wheel part 26 and it is necessary in order to avoid lifting at the load flanks. The magnitude of the bracing arrangement of the second wheel part 28 may be realised and may be set by means of the eccentricity and/or the elasticity of the second wheel part 28. These parameters are dimensioned in dependence upon the magnitude of the backlash between the meshing wheels 12, 14 and 16 and the negative portions of the torque that is to be transmitted.

Reference is made to the fact that the eccentricity of the centre of rotation of the second wheel part 28 in relation to the centre of rotation of the first wheel part 26 (in other words that the axes A and B are offset parallel with respect to one another) is necessary so that the tooth flanks 42A of the second wheel part 28 lie against the trailing edges 38B of the drive wheel 12 and simultaneously the tooth flanks 42B of the second wheel part 28 lie against the trailing edges 40B of the output gear wheel 16. This function would not be possible to realise with a second wheel part that is mounted in a concentric manner with respect to the first wheel part. In the case of a bracing arrangement in the form of a rotation in the peripheral direction of a second wheel part that is mounted in a concentric manner with respect to the first wheel part, only one of the tooth flanks of the second wheel part would come into contact with a trailing edge of the drive wheel (or the output wheel). The other tooth flank of the second wheel part would in contrast come into contact with a load flank of the output wheel (or the drive wheel) on account of the change of flank.

Figure 4:
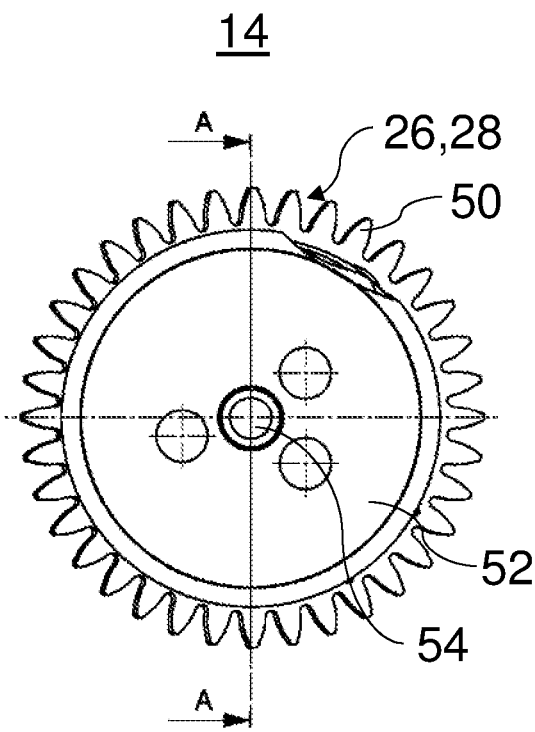
FIG. 4 illustrates a front view of an idler gear in accordance with an exemplary embodiment.
Figure 5:
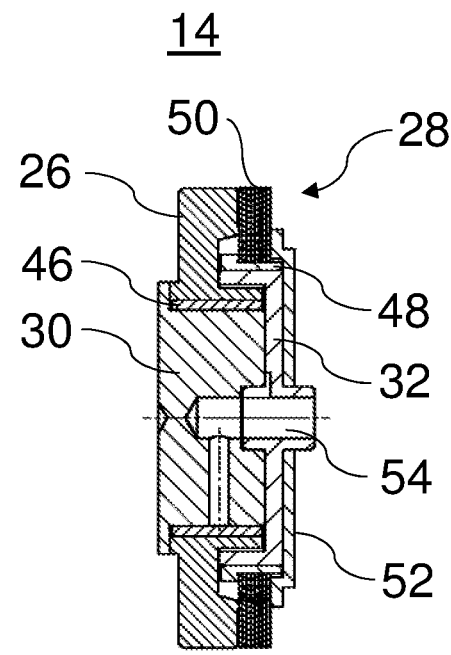
FIG. 5 illustrates a sectional view of the idler gear along a line A-A in FIG. 4.
Figure 6:
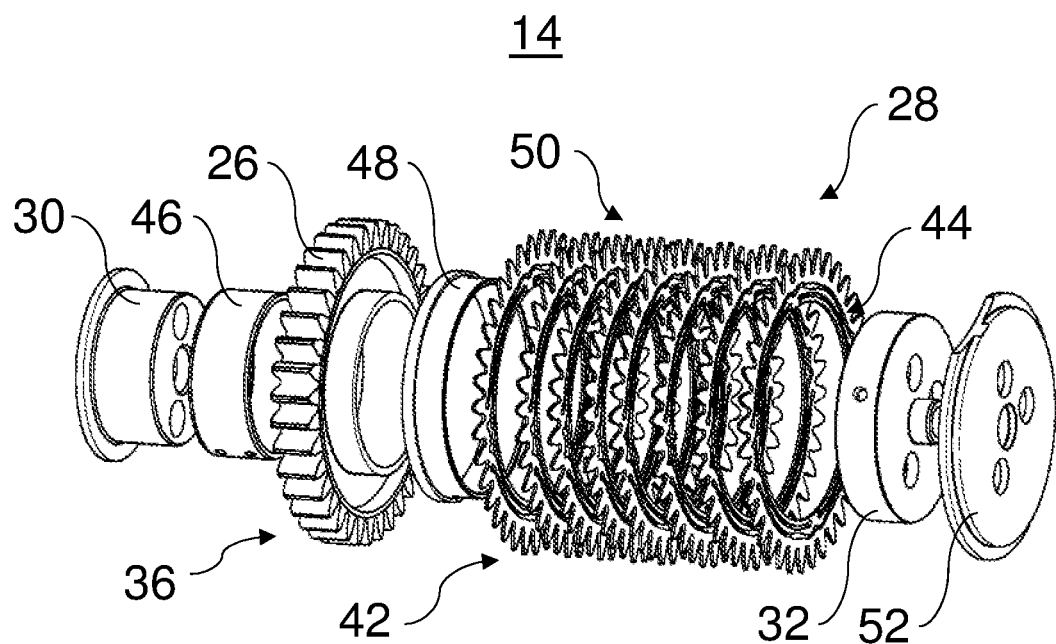
FIG. 6 illustrates an exploded view of the idler gear in accordance with the exemplary embodiment.

An exemplary embodiment of the idler gear 14 is described below with reference to the FIGS. 4 to 6, said idler gear being based upon the model of the gear train 10 that is described with reference to the FIGS. 1 to 3.

The idler gear 14 comprises the first wheel part 26 and the second wheel part 28. The first wheel part 26 is mounted via a first plain bearing bush 46 in a rotatable manner on the first wheel stud 30. The second wheel part 28 is mounted via a second plain bearing bush 48 in a rotatable manner on the second wheel stud 32. The first wheel part 26 and the second wheel part 28 may rotate relative to one another. The offset arrangement of the teeth 36 of the first wheel part 26 and the teeth 42 of the second wheel part 28 and also the eccentric arrangement of the centre of rotation of the second wheel part 28 in relation to the centre of rotation of the first wheel part 26 are barely visible in typical application examples, as is illustrated in the exemplary embodiments shown in FIGS. 4 and 6.

In the exemplary embodiment the first wheel part 26 is embodied from a solid material. The second wheel part 28 is formed from a stack of multiple (eight in the exemplary embodiment) gear wheel sheets 50 that are arranged adjacent to one another. The gear wheel sheets 50 may comprise by way of example a material thickness of 1 mm. The gear wheel sheets 50 are oriented in an axial direction in alignment with one another. The gear wheel sheets 50 may deform in an elastic manner in a radial direction in relation to an axis of rotation of the second wheel part 28. The gear wheel sheets 50 comprise multiple elongated holes 44 so as to provide the elasticity of said gear wheel sheets 50. The elongated holes 44 extend in a circular or helical manner in a peripheral direction about the axis of rotation of the second wheel part 28. In particular, the gear wheel sheets 50 may be produced from a spring steel.

In addition, the idler gear 14 comprises a thrust washer 52. The wheel studs 30, 32 may be fastened via multiple screws (not illustrated) on a crankcase of the internal combustion engine. The wheel studs 30, 32 may be fastened to one another via a press fit arrangement. The thrust washer 52 may sit with a press fit arrangement on the second wheel studs 32. As a consequence, the idler gear 14 may be mounted as one unit. The thrust washer 52 supports the gear wheel sheets 50 axially and therefore prevents the gear wheel sheets 50 from bending.

The plain bearing bushes 46, 48 may be embodied as a hydrodynamic plain bearing that must be supplied with sufficient lubricating fluid during operation. The lubricating fluid may be supplied from a central lubricating fluid duct 54 in the first and second wheel studs 30, 32 via radial ducts in the wheel studs 30, 32 to the plain bearing bushes 46, 48.

The invention is not limited to the preferred exemplary embodiments described above. On the contrary, a plurality of variants and modifications are possible that likewise make use of the inventive idea and consequently are included in the scope of protection. In particular, the invention also claims protection for the subject matter and the features of the dependent claims independently of the claims that are included by reference. In particular, the features of the dependent claims are also disclosed independently of all the features of the independent Claim 1 and by way of example independently of the features in relation to the presence and the configuration of the first wheel part and/or the second wheel part of the independent Claim 1.

LIST OF REFERENCE NUMERALS

10 Gear train
12 Drive wheel
14 Idler gear
16 Output wheel
18 Wheel stud
20 Crankshaft
22 Wheel stud
24 Auxiliary consumer
26 First wheel part
28 Second wheel part
30 First wheel stud
32 Second wheel stud
34 Screw
36 Teeth
36A First load flank
36B Second load flank
38 Teeth
38A Load flank
38B Trailing edge
40 Teeth
40A Load flank
40B Trailing edge
42 Teeth
42A First tooth flank
42B Second tooth flank
44 Elastic region (elongated holes)
46 First plain bearing bush
48 Second plain bearing bush
50 Gear wheel sheet
52 Thrust washer
54 Lubricating fluid duct
A First axis
B Second axis
C Arrow along the angle bisector
D Rotation direction

The invention claimed is:

1. A gear wheel for reducing backlash and/or compensating for backlash in a gear train, said gear wheel comprising:
a first wheel part having multiple teeth that are distributed over a periphery of the first wheel part, wherein the first wheel part may rotate about a first axis (A);
a second wheel part having multiple teeth that are distributed over a periphery of the second wheel part, wherein the second wheel part may rotate about a second axis (B) that is arranged parallel to and offset with respect to the first axis (A);
a first wheel stud about which the first wheel part is mounted in a rotatable manner; and
a second wheel stud about which the second wheel part is mounted in a rotatable manner,
wherein the first wheel stud and the second wheel stud are fastened to one another in an eccentric manner with respect to one another via a press fit arrangement or a screw connection.

2. The gear wheel according to claim 1, wherein
the second wheel part may deform in regions in an elastic manner in a radial direction in relation to the second axis (B); and/or
the second wheel part may rotate relative to the first wheel part.

3. The gear wheel according to claim 1, wherein:
the second wheel part comprises at least one gear wheel sheet, wherein the at least one gear wheel sheet may deform in an elastic manner in a radial direction in relation to the second axis (B).

4. The gear wheel according to claim 3, further comprising:
multiple gear wheel sheets arranged adjacent to one another and forming a gear wheel sheet stack.

5. The gear wheel according to claim 3, wherein:
the at least one gear wheel sheet is produced from a spring steel.

6. The gear wheel according to claim 3, wherein
the at least one gear wheel sheet comprises at least one elongated hole, so as to provide an elasticity of the second wheel part, wherein the at least one elongated hole extends in a peripheral direction about the second axis (B) in a circular and/or helical manner.

7. The gear wheel according to claim 1, further comprising:
a first plain bearing bush arranged between the first wheel stud and the first wheel part; and
a second plain bearing bush arranged between the second wheel stud and the second wheel part.

8. The gear wheel of claim 1, wherein the gear wheel comprises an idler gear.

9. A gear train for a motor vehicle, comprising:
an idler gear comprising a gear wheel having a first wheel part having multiple teeth distributed over a periphery of the first wheel part, wherein the first wheel part may rotate about a first axis (A); the gear wheel further having a second wheel part having multiple teeth distributed over a periphery of the second wheel part, wherein the second wheel part may rotate about a second axis (B) that is arranged parallel to and offset with respect to the first axis (A);
a drive wheel that meshes with the first wheel part of the idler gear and the second wheel part of the idler gear; and
an output wheel that meshes with the first wheel part of the idler gear and the second wheel part of the idler gear;
wherein the second axis (B) is arranged offset in relation to the first axis (A) in a direction of an angle bisector in relation to an angle that is defined between an axis of rotation of the drive wheel, of the first axis (A) and an axis of rotation of the output wheel.

10. The gear train according to claim 9, wherein the gear wheel further comprises:
- a first wheel stud about which the first wheel part is mounted in a rotatable manner; and
- a second wheel stud about which the second wheel part is mounted in a rotatable manner,
- wherein the first wheel stud and the second wheel stud are fastened to one another in an eccentric manner with respect to one another via a press fit arrangement or a screw connection.

11. The gear train according to claim 9, wherein
the second wheel part of the idler gear is braced by trailing edges of the drive wheel and by trailing edges of the output wheel in a direction with respect to the second axis (B) in an elastic manner.

12. The gear train according to claim 9, wherein
load flanks of the drive wheel and load flanks of the output wheel are in engagement with the first wheel part, and trailing edges of the drive wheel and trailing edges of the output wheel are in engagement with the second wheel part.

13. The gear train according to claim 9, wherein
the multiple teeth of the first wheel part contact load flanks of the drive gear wheel and load flanks of the output gear wheel; and
the multiple teeth of the second wheel part contact trailing edges of the drive gear wheel and trailing edges of the output gear wheel.

14. The gear train according to claim 9, wherein:
a lifting of the multiple teeth of the first wheel part from load flanks of the drive wheel and from load flanks of the output wheel in the case of a change of sign of the drive torque and/or the output torque and/or in the case of torsional oscillations is counteracted by means of bracing the second wheel part said bracing resulting from the offset between the second axis (B) and the first axis (A) and an elasticity of the second wheel part.

15. The gear train according to claim 9, further comprising:
- at least one further output wheel that meshes with the idler gear; and
- a further wheel part of the idler gear is provided for each of the at least one further output wheel, said further wheel part being embodied in each case corresponding to the second wheel part of the idler gear.

16. A motor vehicle, comprising:
a gear train having
- an idler gear comprising a gear wheel having a first wheel part having multiple teeth distributed over a periphery of the first wheel part, wherein the first wheel part may rotate about a first axis (A); the gear wheel further having a second wheel part having multiple teeth distributed over a periphery of the second wheel part, wherein the second wheel part may rotate about a second axis (B) that is arranged parallel to and offset with respect to the first axis (A);
- a drive wheel that meshes with the first wheel part of the idler gear and the second wheel part of the idler gear; and
- an output wheel that meshes with the first wheel part of the idler gear and the second wheel part of the idler gear;
wherein the second axis (B) is arranged offset in relation to the first axis (A) in a direction of an angle bisector in relation to an angle that is defined between an axis of rotation of the drive wheel, of the first axis (A) and an axis of rotation of the output wheel.

17. The motor vehicle of claim 16, further comprising:
a compressor for compressing air that is driven via the gear train.

18. The motor vehicle of claim 16, wherein the motor vehicle is a commercial vehicle.

* * * * *